(12) United States Patent
Klann

(10) Patent No.: US 6,415,491 B1
(45) Date of Patent: Jul. 9, 2002

(54) DEVICE FOR REPLACING TOOTHED BELT PULLEYS ON MOTOR VEHICLE ENGINES

(75) Inventor: Horst Klann, Villingen-Schwenningen (DE)

(73) Assignee: Klann Tools Ltd. (GB)

( * ) Notice: Subject to any disclaimer, the term of this patent is extended or adjusted under 35 U.S.C. 154(b) by 0 days.

(21) Appl. No.: 09/945,900

(22) Filed: Sep. 4, 2001

(30) Foreign Application Priority Data

Sep. 5, 2000 (DE) .......................................... 100 43 980

(51) Int. Cl.[7] ................................................ B23P 19/04
(52) U.S. Cl. .............................. 29/259; 29/278; 29/271
(58) Field of Search ........................... 29/259, 258, 255, 29/271, 278, 281.5, 263

(56) References Cited

U.S. PATENT DOCUMENTS

| | | | |
|---|---|---|---|
| 2,860,407 A | | 11/1958 | Grunder et al. |
| 3,986,242 A | | 10/1976 | Kerr |
| 5,333,378 A | * | 8/1994 | Sjobom ........................ 29/263 |
| 5,692,282 A | * | 12/1997 | Baca ............................ 29/259 |
| 5,729,881 A | * | 3/1998 | Kent ............................ 29/252 |
| 6,305,061 B1 | * | 10/2001 | King ............................ 29/259 |

FOREIGN PATENT DOCUMENTS

| | | |
|---|---|---|
| DE | 81 12 989 | 9/1981 |
| DE | 93 15 919 | 2/1994 |

* cited by examiner

Primary Examiner—Joseph J. Hail, III
Assistant Examiner—Lee Wilson
(74) Attorney, Agent, or Firm—McGlew and Tuttle, P.C.

(57) ABSTRACT

The device (1) for replacing toothed belt pulleys (61) on motor vehicle engines (65) includes a pull-off disk (2), which is provided with at least two tie rods (7, 8, 9, 10). To pull off the toothed belt pulley (61), the tie rods (7, 8, 9, 10) can be engaged with at least two openings (57, 58, 59, 60) of the toothed belt pulley (61) in an axially firmly seated manner. The pull-off disk (2) is provided with a central threaded hole, into which a spindle drive, by which the toothed belt pulley (61) can be pulled off from its seating via of the pull-off disk (2) engaging the toothed belt pulley (61), can be inserted. To simplify handling as much as possible, a wrench can be attached to the fastening screw connection (66) of the toothed belt pulley (61) through the threaded hole. Furthermore, the pull-off disk (2) has at least one additional opening (14) to receive in a positive-locking manner a coupling piece of a locking tool, by which the toothed belt pulley (61) can be locked in its particular rotated position via the pull-off disk (2).

17 Claims, 7 Drawing Sheets

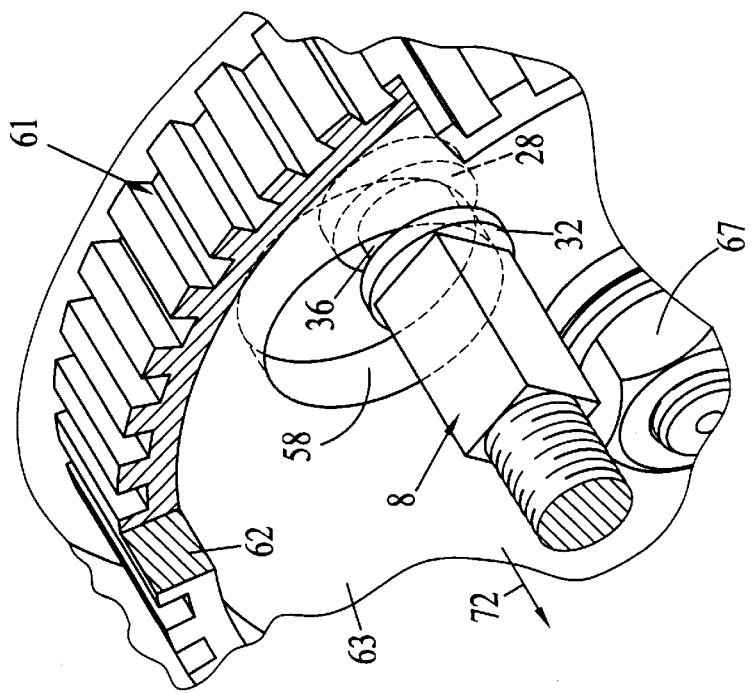
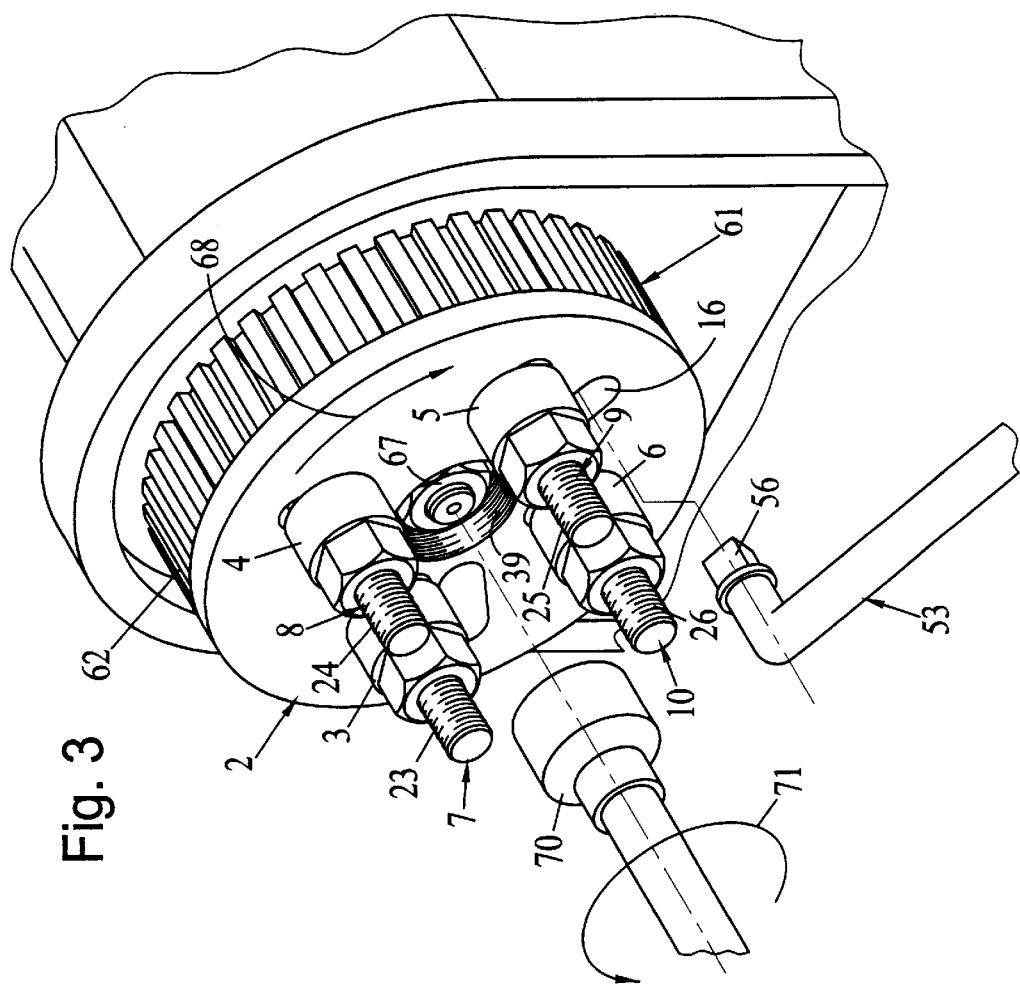

DEVICE FOR REPLACING TOOTHED BELT PULLEYS ON MOTOR VEHICLE ENGINES

FIELD OF THE INVENTION

The present invention pertains to a device for replacing toothed belt pulleys on motor vehicle engines, comprising a pull-off disk, which is provided with at least two tie rods, which can be brought into engagement with at least two openings of the toothed belt pulley in an axially firmly seated manner for pulling off the toothed belt pulley, and a spindle drive, which is arranged essentially centrally in the pull-off disk and by the actuation of which the toothed belt pulley is pulled off from its seating by means of the pull-off disk engaging the toothed belt pulley.

BACKGROUND OF THE INVENTION

A device of this type (prospectus of the company Facom; "Facom-Automativ" Sonderaktion 98–99, page 8) has been known, which comprises a pull-off disk, which is provided with three tie rods. This prior-art device is used to replace toothed belt pulleys of a motor vehicle engine, which are provided for driving, e.g., the camshaft of the motor vehicle engine. To pull off the toothed belt pulley, this prior-art device with its tie rods can be engaged with three corresponding openings of the toothed belt pulley in an axially firmly seated manner.

The tie rods have an essentially cylindrical design and have at their free end located toward the toothed belt pulley a receiving groove directed in the circumferential direction of the pull-off disk, with which groove they can be brought into positive-locking engagement with the edge areas of one of the openings of the toothed belt pulley.

Furthermore, the pull-off disk of the prior-art device is provided with an essentially centrally arranged spindle drive, by the actuation of which the toothed belt pulley is pulled off from its seating by means of the pull-off disk engaging the toothed belt pulley and the tie rods of the said pull-off disk. The spindle drive is actuated by means of a commercially available wrench, e.g., in the form of a so-called ratchet, which is placed on a corresponding drive hexagon of the spindle drive.

In the prior-art device, the spindle drive comprises a pressure screw, which has the above-mentioned drive hexagon on its outer free end and which is screwed axially adjustably into a central, threaded through hole of the pull-off disk. During the pull-off operation, this pressure screw presses with its end located opposite the drive hexagon the seating or the end of the camshaft on the front side, so that an axial relative movement of the pull-off disk in relation to the camshaft will be obtained. Since the pull-off disk with its tie rods in the openings of the toothed belt pulley engages the toothed belt pulley in an axially firmly seated manner, the toothed belt pulley is pulled off from its seating at the same time during this operation.

In the case of toothed belt pulleys seated extremely firmly on their seating, it is frequently necessary to lock the toothed belt pulley in its particular rotated position. A so-called drive belt lock, which comprises a toothed belt band and a locking lever, is provided for this purpose according to page 9 of the above-mentioned company catalog. To lock the toothed belt pulley, the toothed belt band is placed around the toothed belt pulley and is connected by its two ends to the locking lever. The fastening of the toothed belt band to the locking lever is selected to be such that a certain pretension of the toothed belt band is obtained during the locking and the toothed belt band surrounds the toothed belt pulley with its teeth in a firmly seated manner. This so-called drive belt lock may also be used to loosen the fastening screw connection of the toothed belt pulley before the toothed belt pulley is pulled off from its seating.

This means that two tools, which must be attached separately to the toothed belt pulley in order to remove the toothed belt pulley, are needed to lock the toothed belt pulley, on the one hand, and to pull off the toothed belt pulley from its seating, on the other hand. The handling especially of the drive belt lock is very complicated, so that slipping off of the drive belt lock, e.g., due to incorrect attachment to the toothed belt pulley, is easily possible. Furthermore, the drive belt lock must be attached to the toothed belt pulley twice, namely, once to loosen the fastening screw connection and again to attach the pull-off disk with its tie rods and to be able to actuate the spindle drive because the drive belt lock is not held automatically in a firmly seated manner at the toothed belt pulley. It is not possible to attach the pull-off disk before the fastening screw connection has been loosened because the fastening screw is not accessible from the outside with a corresponding wrench when the toothed belt pulley is attached.

To avoid the complicated attachment of the drive belt lock, at least to loosen the fastening screw connection, a lever tool, which is called a drive disk carrier and which can likewise be brought into engagement with corresponding openings with locking pins in a positive-locking manner, has been known from page 8 of the above-mentioned company catalog. The fastening screw connection of the toothed belt pulley is freely accessible from the outside in the case of this wrench and this drive disk carrier can also be inserted into the corresponding openings of the toothed belt pulley in a very simple manner. Thus, two individual tools, which must be engaged individually with the toothed belt pulley, are necessary to replace a toothed belt pulley according to the devices known from the said company catalog of the firm of Facom, and three individual tools are necessary for simple handling, because the drive disk carrier cannot be used for the use of the pull-off disk, either, because due to its shape, this drive disk carrier covers from the outside the openings of the toothed belt pulley which the tie rods of the pull-off disk must engage to pull off the toothed belt pulley, i.e., the drive belt lock must always be used to lock the toothed belt pulley when the pull-off disk is used.

SUMMARY AND OBJECTS OF THE INVENTION

Consequently, the primary object of the present invention is to improve a device of this type for removing or replacing toothed belt pulleys such that an extremely simple and safe handling is guaranteed, and, in particular, the above-mentioned drawbacks of the prior-art device are avoided.

This object is accomplished according to the present invention in that to receive the spindle drive, the pull-off disk has a central, threaded through hole, through which a wrench can be attached to the fastening screw connection of the toothed belt pulley, and that the pull-off disk has at least one additional opening for receiving in a positive-locking manner a coupling piece of a locking tool, by which the toothed belt pulley can be locked in its particular rotated position by means of the pull-off disk.

An extremely simple device which can be handled in a reliable manner is made available for replacing toothed belt pulleys due to an embodiment according to the present invention.

To receive the spindle drive, the pull-off disk is provided for this purpose with a central, threaded through hole, through which a wrench can be attached to the fastening screw connection of the toothed belt pulley. Such a wrench may be, e.g., a standard socket in conjunction with a ratchet. Provisions are made according to the present invention for the threaded through hole to have a correspondingly large diameter for the spindle drive, through which such a socket can be inserted to loosen the fastening screw connection of the toothed belt pulley and attached to the fastening screw connection.

At the same time, the pull-off disk is provided with at least one additional opening to receive a coupling piece of a locking tool in a positive-locking manner. Such a locking tool may be, e.g., a simple, bent locking lever, at the bent end piece of which a corresponding coupling piece is provided. This coupling piece may be designed, e.g., as a simple square, which can be introduced into the additional opening of the pull-off disk in a positive-locking manner.

The pull-off disk according to the present invention is thus hung with its tie rods into the openings of the pull-off disk in a simple manner and is brought into engagement with same in a positive-locking manner, e.g., in the manner already known from the state of the art described in the introduction.

The spindle drive is therefore removed from the threaded through hole of the pull-off disk to loosen the fastening screw connection. To loosen the fastening screw, the fitting wrench is correspondingly attached to the fastening screw and the toothed belt pulley is locked in the particular rotated position by means of the locking tool, so that the toothed belt pulley is also locked because of the positive-locking connection with the pull-off disk and with the tie rods of the pull-off disk. Simple loosening of the fastening screw connection can be carried out in this mounted position of both the wrench for the fastening screw connection and the locking tool and the pull-off disk with its tie rods.

After the fastening screw connection has been loosened, the wrench is removed together with the fastening screw connection and the spindle drive is inserted into the central threaded through hole of the pull-off disk.

By subsequently actuating the spindle drive, the spindle drive is supported, as is known from the prior art, on the front side on the corresponding shaft, to which the pull-off disk is attached, so that the toothed belt pulley is pulled off by means of the pull-off disk and the tie rods engaging the toothed belt pulley. The rotated position of the toothed belt pulley can be locked by means of the locking tool at the same time even in the fixed position of the toothed belt pulley, so that the correspondingly necessary strong pulling forces can also be applied via the pull-off disk and the tie rods even at a high drive torque on the spindle drive, without the toothed belt pulley, on the one hand, and the correspondingly locked camshaft, on the other hand, being able to rotate.

Thus, the embodiment according to the present invention provides a device with which a toothed belt pulley can be removed from its seating with the lowest possible effort and with extremely simple handling.

The seatings are usually coordinated with the dimensions of the toothed belt pulley such that it can be mounted in the reverse direction in a simple manner.

To do so, the fastening screw connection is again attached with the toothed belt pulley mounted and tightened by means of a wrench. The pull-off disk with its tie rods now again engages the openings of the toothed belt pulley and can be locked in the desired rotated position by the locking tool, which is received in the additional opening in a positive-locking manner. A corresponding tightening of the fastening screw connection can thus also be carried out reliably and correctly.

According to another aspect of the invention, the tie rods can be received in the pull-off disk in radially extending guide slots in a radially adjustable manner. Due to this adjustable mounting, the tie rods can be adapted to different toothed belt pulleys with openings arranged differently in a simple manner. The device according to the present invention with its pull-off disk according to the present invention can thus also be used for toothed belt pulleys of different shapes.

Due to the embodiment according to another aspect of the invention, the pull-off disk can be connected in a fixed manner to the toothed belt pulley by means of the tie rods. To do so, the tie rods are provided with a guide section each, with which they can be received in the corresponding guide slot of the pull-off disk in an axially displaceable and nonrotatable manner. The guide sections have at least two guide surfaces, which extend in parallel to the corresponding central longitudinal axis of the tie rods and by which the tie rods are guided in the correspondingly associated guide slot of the pull-off disk with a small clearance.

For the axial adjustment, provisions are made according to another aspect of the invention to provide the tie rods with corresponding adjusting nuts. The pull-off disk can be braced in a firmly seated manner against the toothed belt pulley by these adjusting nuts and the tie rods engaging the toothed belt pulley. This in turn means that the pull-off disk can be arranged on the toothed belt pulley in a firmly seated and simple manner and a further attachment of both the wrench for loosening of the fastening screw connection and of the locking tool to the pull-off disk can be performed in a simple manner, without the pull-off disk with its tie rods being able to become detached from the toothed belt pulley. In particular, the handling of the device according to the present invention is considerably facilitated as a result.

Due to the embodiment according to another aspect of the invention, the tie rods can be caused to engage edge areas of the openings of the toothed belt pulley, which edge areas are located to the left and right in the direction of rotation in the circumferential direction. Provisions are made for this purpose for the tie rods to be provided at their corresponding ends facing the toothed belt pulley with circular stop webs, with which the tie rods extend behind the corresponding openings of the toothed belt pulley in some areas in a positive-locking manner. Due to the circular shape of these stop webs, such a positive-locking engagement can be performed reliably in the edge areas of the openings located to the right and to the left in the circumferential direction, as was mentioned above. This is especially advantageous during the tightening of the fastening screw connection, because the tie rods can now be arranged in the corresponding edge area of the openings against the respective direction of rotation during the tightening of the fastening screw connection and are blockingly in contact with this edge area against the direction of rotation occurring during the tightening, so that slipping off from the openings is reliably prevented from occurring.

To secure a defined position of the pull-off disk during use, the pull-off disk according to another aspect of the invention has an at least partially circular centering shoulder, with which it can be inserted into the toothed belt pulley or attached to the toothed belt pulley in a centered manner.

To make it possible to attach the pull-off disk according to the present invention to toothed belt pulleys of different sizes in a centered manner, provisions are made according to another aspect of the invention for the pull-off disk to have a plurality of centering shoulders adapted in diameter to these sizes of the toothed belt pulleys.

According to another aspect of the invention, it is also possible to provide a plurality of guide slots in the pull-off disk, whose number and arrangement are adapted to the number and arrangement of the openings in the toothed belt pulley. Provisions are now made, in particular, for the number and the arrangement of the guide slots in the pull-off disk to be selected to be such that the pull-off disk can also be used for different toothed belt pulleys with openings arranged differently. For example, four guide slots may be arranged in a cross-shaped pattern in relation to one another, and two additional guide slots, which are arranged at an angle of 120° to each other and in relation to one of the four guide slots, are additionally associated with these guide slots. As a consequence, toothed belt pulleys provided with two diametrically opposed openings, with four openings arranged in a cross-shaped pattern or with three openings arranged at 120° in relation to one another can be replaced with such a pull-off disk. Corresponding to the number of openings present in the toothed belt pulley, at most only as many tie rods can be used as are brought into engagement with the corresponding openings. In a preferred embodiment, a plurality of groups of radial guide slots are provided, whose groupwise angular arrangement in the pull-off disk is selected to be such that the pull-off disk can be used for toothed belt pulleys with two, three, four, five, six or seven openings arranged distributed uniformly on the circumference. For example, only two diametrically opposed guide slots with tie rods inserted. correspondingly in these are used in this variant, e.g., in the case of the crosswise arrangement of four openings in the toothed belt pulley. If, in contrast, the toothed belt pulley has, e.g., six openings, only three guide slots with an angular offset of 120° in relation to one another may be sufficient with corresponding tie rods.

Since the pull-off disk has only a limited area for arranging the radial guide slots, pull-off disks of different designs with different arrangements of guide slots may also be provided for pulling off toothed belt pulleys of different shapes according to another aspect of the invention.

To obtain the simplest and least expensive spindle drive possible, provisions are made according to another aspect of the invention for the spindle drive to have a threaded sleeve, which can be screwed into the threaded hole of the pull-off disk and which is in turn provided with a corresponding threaded hole to insert a pressure screw. The pressure screw may have a known design as is known from the state of the art and is correspondingly used during its actuation to pull off the toothed belt pulley. Due to the provision of this separate threaded sleeve, the central threaded through hole in the pull-off disk can have a sufficiently large dimension in order to pass through the wrench to be attached to the fastening screw connection. On the other hand, however, the diameter of the pressure screw may also be selected to be smaller, because a diameter compensation is achieved by means of the threaded sleeve provided.

According to another aspect of the invention, a pressure piece may be provided, which can be inserted with a centering pin into a threaded hole of the fastening screw connection of a toothed belt shaft to support the spindle drive during the pulling off of the toothed belt pulley in a centered manner. It is known that toothed belt pulleys are screwed to the camshaft and to their seating in a firmly seated manner by means of nuts and a corresponding threaded pin of the camshaft. Furthermore, designs have also been known in which the camshaft has a threaded hole, into which a corresponding fastening screw is inserted, instead of these fastening nuts with threaded pin. Since the screw-in thread for the fastening screw is still present in the center of the camshaft after the loosening of this fastening screw connection in the form of a fastening screw, the pressure piece with its centering pin is provided, with which the pressure piece can be inserted into the threaded hole with a clearance. The pressure piece is now supported with a circular contact web, which is larger than the centering pin, on the circular front ring located around the screw-in thread, so that damage during pulling off, especially in the case of strong pressing forces of the spindle drive on the mounting thread of the camshaft, is ruled out with certainty. To make it possible to insert the pressure piece into the threaded hole of, e.g., the camshaft as simply as possible, the centering pin may also have a conical shape.

To obtain a sufficiently great path of adjustment of the device, the pull-off disk may have, according to another aspect of the invention, an outwardly directed threaded dome in the area of its central threaded through hole to receive the spindle drive. It is possible due to this embodiment to increase the axial distance between the spindle drive and the toothed belt pulley such that, e.g., an axially projecting mounting hub of the toothed belt pulley can also be received in the central threaded through hole of the pull-off disk or that this threaded hole can be radially expanded in this area located axially toward the toothed belt pulley, so that this mounting hub is securely held in the pull-off disk during the pull-off operation or with the pull-off disk attached.

According to another aspect of the invention, the pull-off disk may also have a bell-shaped design for a similar purpose and have a circular support wall, with which the pull-off disk can be attached to the toothed belt pulley in a centered manner. It is also ensured by this design that the pull-off disk cannot collide with an axially projecting mounting hub of the toothed belt pulley during the attachment of the pull-off disk.

To further simplify the design of the pull-off disk, provisions may be made according to another aspect of the invention for the additional opening to be formed by one of the guide slots, which is provided to receive a tie rod. Provisions are also made for the dimensions of the guide slots to be selected to be such that these can be used alternatingly to receive the guide section of a tie rod or the coupling section of the locking tool.

Due to the embodiment according to the present invention according to another aspect of the invention, contact of the mounting section with one of its contact surfaces in the corresponding opening of the toothed belt pulley over the largest possible area is obtained during use. This in turn causes a considerable reduction in the contact pressure between the contact surface and the corresponding opening of the toothed belt pulley, so that damage especially to the toothed belt pulley is prevented from occurring with certainty. The tie rods have a mounting section for this purpose with at least one contact surface bent radially in the outwardly direction, whose radius of curvature approximately corresponds to the radius of an opening of the toothed belt pulley, which opening is engaged by the tie rod for pulling off the toothed belt pulley.

As was mentioned above in connection with another aspect of the invention, the number of guide slots is adapted to the number and arrangement of the openings in a toothed belt pulley. Due to the many different possible applications for different toothed belt pulleys, it is always guaranteed that at least one of the guide slots provided will not be used.

Thus, if, e.g., only two openings are provided in the toothed belt pulley, but more than two guide slots are provided in the pull-off disk, one of the additional guide slots can be used to receive the locking tool.

The device according to the present invention thus makes available a device for replacing toothed belt pulleys of a motor vehicle engine which can be handled in an extremely simple manner, on the one hand, and with which both the loosening of the fastening screw connection and the pulling off of the toothed belt pulley with the fastening screw connection removed can be performed, on the other hand, in a simple manner. It is guaranteed that the toothed belt pulley can also be securely locked in its rotated position.

The various features of novelty which characterize the invention are pointed out with particularity in the another aspect of the inventions annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a perspective view of the pull-off disk from FIG. 2 in the state attached to the toothed belt pulley;

FIG. 4 is an enlarged perspective partial section of the toothed belt pulley from FIG. 3 with a tie rod attached through an opening;

DESCRIPTION OF THE PREFERRED EMBODIMENTS

Figure 1:
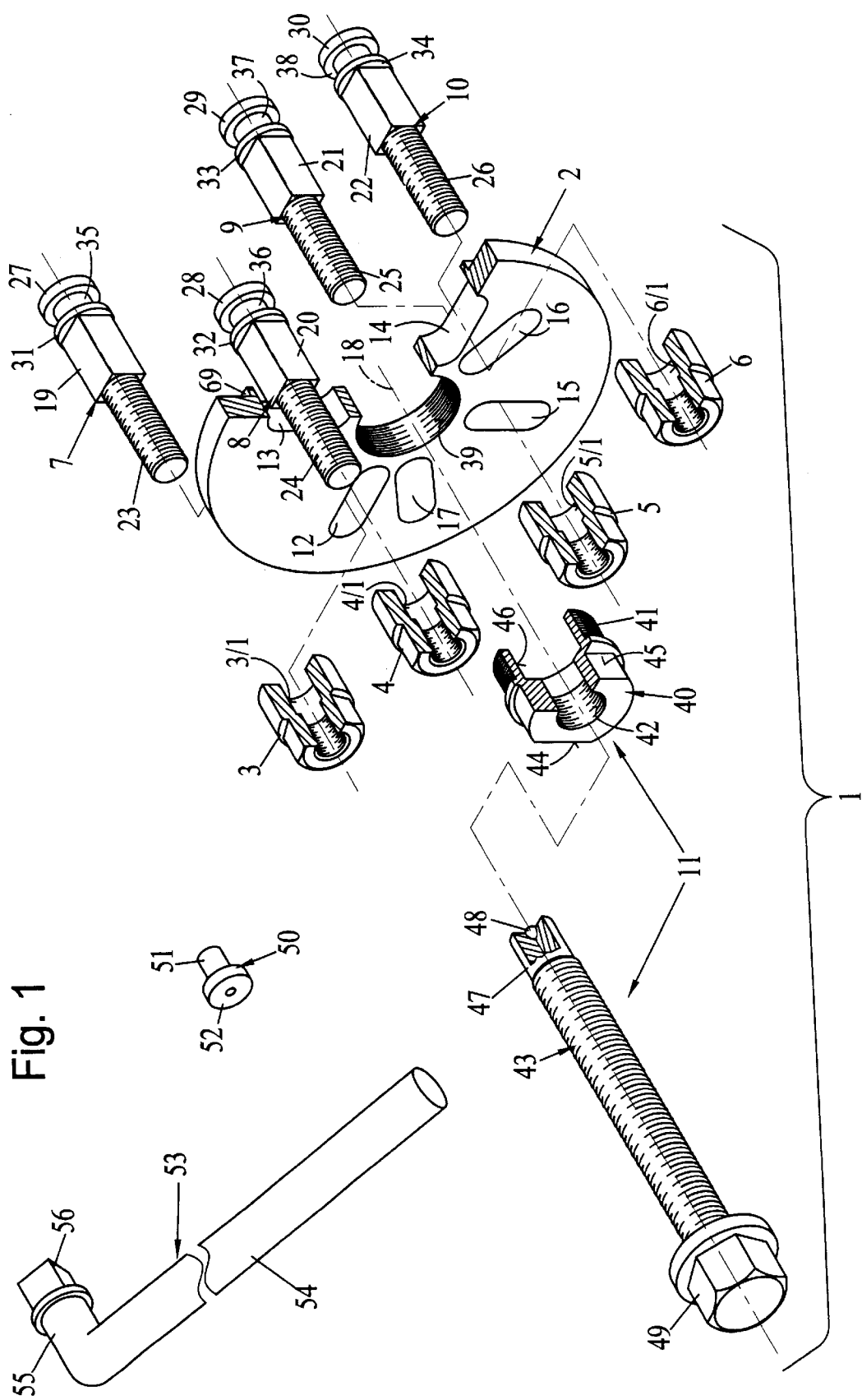
FIG. 1 is a perspective exploded view of a device according to the present invention.

Referring to the drawings in particular, FIG. 1 shows a first exemplary embodiment of a device 1 according to the present invention, which comprises a central pull-off disk 2, a plurality of tie rods 7, 8, 9 and 10 which can be mounted on the pull-off disk 2 by means of adjusting nuts 3, 4, 5 and 6, as well as a spindle drive 11, which can be coupled with the pull-off disk 2.

To mount the tie rods 7 through 10 as desired, the pull-off disk 2 has, e.g., two groups of guide slots 12, 13, 14 and 15 as well as 13, 16 and 17. The guide slots 12 through 17 extend radially to the axis of symmetry 18 of the pull-off disk 2, and the guide slots 12 through 15 are arranged distributed uniformly on the circumference at right angles to one another and thus extend in a cross-shaped pattern.

The second group of guide slots, to which the guide slot 13 of the first group also belongs, are arranged distributed uniformly on the circumference at an angle of 120° each. These guide slots 12 through 17 are located at spaced locations from one another in the circumferential direction, so that they do not mutually pass through each other.

The tie rods 7 through 10 are provided with a guide section 19, 20, 21 and 22 each, with which the tie rods 7 through 10, fitting one of the guide slots 12 through 17 as desired, are axially displaceable and can be inserted nonrotatably. These guide sections 19 through 22 may have, as is shown in FIG. 1, e.g., a square cross-sectional profile with four guide faces extending in parallel to the central longitudinal axis of the respective tie rod 7, 8, 9, and 10.

In this exemplary embodiment, which is shown in FIG. 1, the tie rod 7 is associated with the guide slot 12, the tie rod 8 with the guide slot 13, the tie rod 9 with the guide slot 14, and the tie rod 10 with the guide slot 15. To fasten the tie rods 7 through 10 in the correspondingly associated guide slots 12 through 15, the adjusting nuts 3 through 6 are provided, which can be screwed onto corresponding threaded sections 23, 24, 25 and 26 of the tie rods 7 through 10, the tie rods 7 through 10 with these threaded sections 22 through 26 being passed through the corresponding guide slots 12 through 15 from the rear side for mounting. To obtain the greatest possible path of adjustment for the variable use of the device according to the present invention, the four adjusting nuts 3, 4, 5 and 6 have an inner, radially expanded mounting section 3/1, 4/1, 5/1 and 6/1 toward the correspondingly associated tie rod 7, 8, 9 and 10, and the guide sections 19, 20, 21 and 22 can be pulled into the said mounting sections 3/1, 4/1, 5/1 and 6/1 during the tightening of the adjusting nuts 3, 4, 5 and 6.

At their ends located opposite their respective threaded sections 23 through 26, the guide bars 7 through 10 are provided with a radially expanded, circular stop web 27, 28, 29 and 30, respectively, with which they can be caused to engage an opening of a toothed belt pulley in a positive-locking manner, as will be described below.

With a guide web 31, 32, 33 and 34 each, which are associated with the stop webs 27 through 30 at axially spaced locations, the stop webs 27 through 30 form a circular, approximately cylindrical receiving groove 35, 36, 37 and 38, whose mode of operation will also be explained in greater detail below.

As is also apparent from FIG. 1, the pull-off disk 2 has a central threaded through hole 39, which is used to receive the spindle drive 11. This central threaded through hole 39 has a relatively large diameter, so that a wrench, e.g., in the form of a socket, can be passed through to loosen a fastening screw connection of a toothed belt pulley.

The spindle drive 11 comprises in this exemplary embodiment a threaded sleeve 40, which is provided with an external thread 41 toward the pull-off disk 2, and the threaded sleeve 40 can be screwed into the central threaded through hole 39 of the pull-off disk 2 by means of the said external thread 41.

The threaded sleeve 40 also has an internal thread 42, which is arranged coaxially to the external thread 41 and is axially offset to the outside in this exemplary embodiment, and is provided to receive a pressure screw 43 in an axially adjustable manner.

In the area of the internal thread 42, the threaded sleeve 40 may be provided with two wrench contact surfaces 44 and 45, which maybe provided correspondingly for screwing in and tightening the threaded sleeve 40 in the pull-off disk 2. Instead of these two wrench contact surfaces, a circular knurled profile may be provided as well, so that the threaded sleeve 40 can be screwed manually into the pull-off disk in a simple manner. The internal thread 42 is joined axially in the area of the external thread 41 by a radially expanded mounting section 46, into which the mounting hub of a corresponding toothed belt pulley can protrude during use depending on the design of the toothed belt pulley.

Toward the pull-off disk 2, the pressure screw 43 has an approximately cylindrical push rod 47, via which the pressure screw 43 is axially supported on the front side on a corresponding camshaft, on which the toothed belt pulley is mounted. Opposite this push rod 47, the pressure screw 43 with its second end is provided with a corresponding drive hexagon 49 or another suitable drive element, by means of which the pressure screw 43 can be rotatingly driven during the pulling off of the toothed belt pulley.

If the fastening screw connection of a toothed belt pulley has a mounting screw, a corresponding internal thread is correspondingly provided in the camshaft on the front side in the area of the seating of the toothed belt pulley. To prevent damage from occurring to this internal thread during the pull-off operation, especially in the case of stronger pulling-off forces, a pressure piece 50 is provided, which can be inserted with a corresponding centering pin 51 into such a threaded hole of the camshaft with a small clearance. The centering pin 51 has, e.g., a cylindrical design in this exemplary embodiment according to FIG. 1.

At its end located on the outside in the mounted state on the camshaft, the centering pin 51 of the pressure piece 50 has a radially expanded, e.g., round support plate 52, with which the pressure piece 50 is supported on the front side on the camshaft during the pull-off operation.

A locking tool 53, likewise shown in FIG. 1, is provided to fix the pull-off disk 2 in a desired rotated position in the state mounted on the toothed belt pulley. This locking tool 53 has a grip part in the form of a bar-shaped lever 54, one end of which has a section 55 bent at an angle of about 90°. This bent section 55 is substantially shorter than the lever 54 and is provided at its free end with a coupling piece 56, which can be plugged fittingly into one of the guide slots 12 through 17 in a positive-locking manner. Due to this positive-locking connection between the coupling piece 56 and one of the guide slots 12 through 17, the pull-off disk 2 can be locked in any desired rotated position by means of the locking tool 53. Instead of this possibility of coupling with one of the guide slots 12 through 17, an additional opening (not shown in the drawing), with which the coupling piece 56, designed as a square in this exemplary embodiment, can be detachably engaged in a positive-locking manner, may also be provided in the pull-off disk 2.

Figure 2:
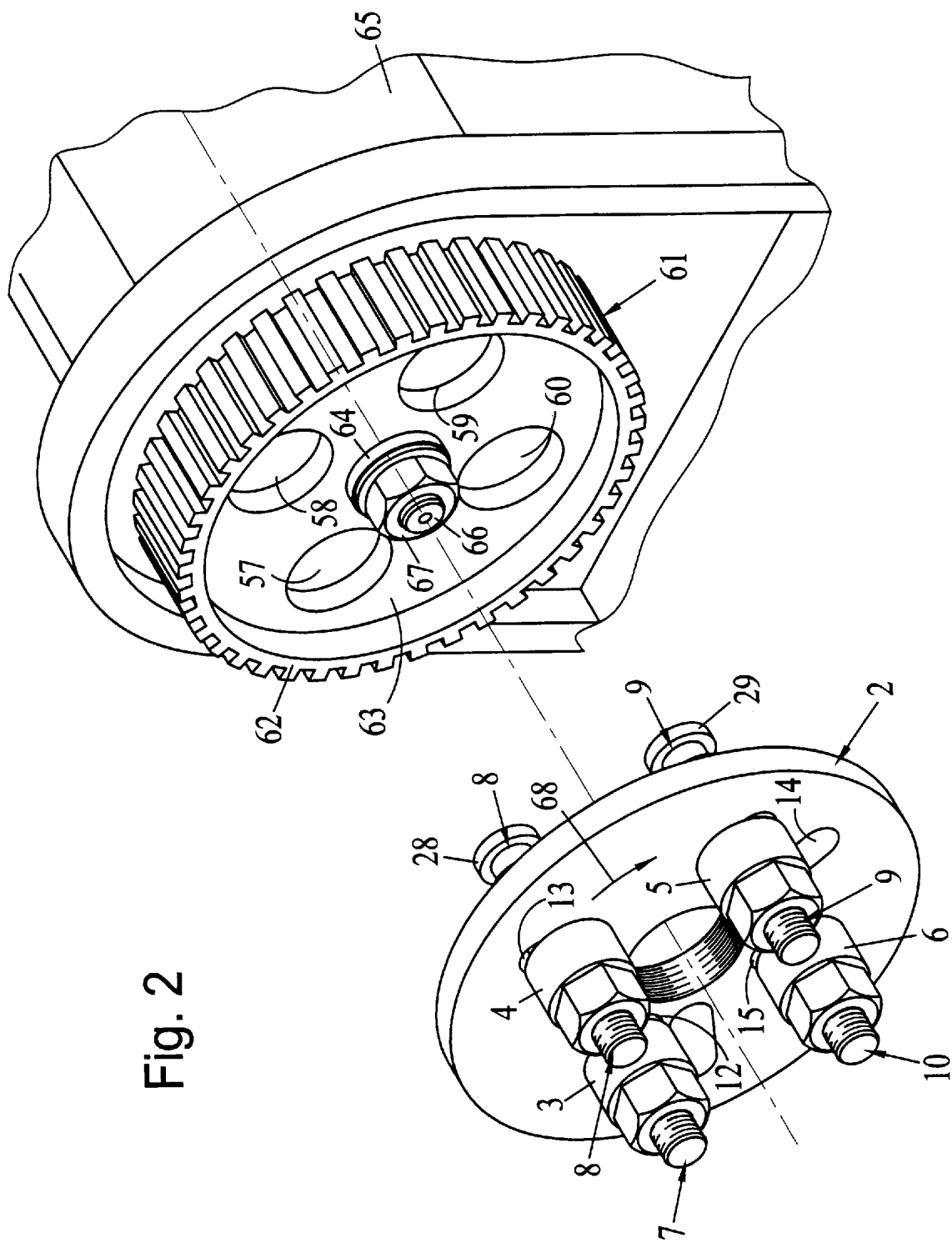
FIG. 2 is a perspective view of part of the device according to the present invention from FIG. 1 in the mounted state together with a toothed belt pulley to be replaced, which is seated on a seating of a camshaft of a motor vehicle engine.

FIG. 2 shows the pull-off disk 2 with the four tie rods 7 through 10, which are preassembled in the guide slots 12 through 15 by means of the correspondingly associated adjusting nuts 3 through 6. The tie rods 7 through 10 with their respective stop webs project over the pull-off disk 2, and only the stop webs 28 and 29 can be recognized in FIG. 2.

The pull-off disk 2 with these stop webs 27 through 30 of its tie rods 7 through 10 can be caused to engage openings 57, 58, 59 and 60 of a toothed belt pulley 61, which is likewise shown in a perspective view in FIG. 2. The toothed belt pulley 61 comprises, as can be clearly recognized from FIG. 2, circumferential outer teeth 62, an inner pulley disk 63, in which the openings 57 through 60 are arranged, and a central mounting hub 64, with which the toothed belt pulley 61 is connected to a seating of a camshaft (not shown in detail) of a motor vehicle engine 65 indicated in FIG. 2 in a firmly seated manner.

A fastening screw connection, comprising a threaded pin 66 of the camshaft as well as a mounting nut 67, is provided for the firmly seated mounting of the toothed belt pulley 61 in the exemplary embodiment according to FIG. 2.

To attach the pull-off disk 2 with its tie rods 7 through 10, the tie rods 7 through 10 with their stop webs 27 through 30 are introduced into the correspondingly associated openings 57 through 60 of the toothed belt pulley 61, so that they will correspondingly extend behind the respective openings 57 through 60 after a relative rotation of the pull-off disk 2 in the direction of arrow 68.

FIG. 3 shows the pull-off disk 2 in such an attached state on the belt pulley 61. It can be recognized that the adjusting nuts 3 through 6 are tightened in this attached state, which can be recognized from the longer threaded sections 23 through 26 of the respective associated tie rods 7 through 10 protruding from the adjusting nuts 3 through 6 compared with FIG. 2.

Due to this tightening of the adjusting nuts 3 through 6, the pull-off disk 2 is held in a firmly seated manner by the stop webs 27 through 30, which extend behind the corresponding openings 57 through 60 of the toothed belt pulley 61, because the correspondingly associated tie rods 7 through 10 perform an axial movement.

To ensure the centered mounting or arrangement of the pull-off disk 2 on the toothed belt pulley 61, the latter is provided with a centering shoulder 69, which fittingly engages the toothed belt pulley 61 and is shown as an example in FIG. 1. In this exemplary embodiment, this centering shoulder 69 is designed as a circular shoulder. However, it is conceivable that this centering shoulder 69 is formed in some sections only, e.g., from individual cylinder segments, which may also be designed as separate components.

Embodiments of tie rods 7, 8, 9 and 10 are also provided in which their threaded sections 23, 24, 25 and 26 are substantially shorter and the adjusting nuts 3, 4, 5 and 6 are also not provided with a radially expanded mounting section 3/1, 4/1, 5/1 and 6/1. As a result, an extremely short overall length of the device 1 mounted on the toothed belt pulley 61 is obtained, because the pull-off disk 2 also has an extremely small axial thickness and is also partially inserted axially with its centering shoulder 69 into the toothed belt pulley 61. The pressure screw 43 can also be made substantially shorter than is shown as an example in FIG. 1. Due to this short design of both the tie rods 7, 8, 9 and 10 and of the pressure screw 43, the device 1 according to the present invention can also be used. directly on an installed motor vehicle engine 65 even under extremely crowded space conditions in the engine compartment of a motor vehicle, without the device 1 for replacing the toothed belt pulley 61 being able to collide with other components of the motor vehicle during use.

It can also be recognized from FIG. 3 that the diameter of the central threaded through hole 39 is selected to be so large that the mounting nut 67 with the threaded pin 66 of the camshaft protrudes at least partially into this threaded through hole 39 in this exemplary embodiment of the pull-off disk 2. The diameter is selected to be so large that the mounting nut 67 is located at such a great radially spaced location from the threaded through hole 39 that a wrench, as is shown as an example in FIG. 3 as a socket 70, can be attached to the mounting nut 67. By rotating the socket 70 attached to the mounting nut 67, e.g., in the direction of arrow 71, the mounting nut 67 can thus be loosened from the threaded pin 66 in a simple manner.

To lock the toothed belt pulley 61 during the loosening of the mounting nut 67 in its angular position, the locking tool 53 is provided, as was mentioned above, which can be inserted with its coupling piece 56 into the still free guide slot 16 of the pull-off disk 2, e.g., in a positive-locking manner. By simply holding the locking tool 53, the toothed belt pulley 61 firmly connected to the pull-off disk 2 via the tie rods 7 through 10 is thus locked in its rotation angle position by means of the pull-off disk 2, so that the mounting nut 67 can be removed in a simple manner, without the toothed belt pulley 61 rotating together with the camshaft.

FIG. 4 shows an enlarged partial section from FIG. 3, in which the positive-locking, axially fixed connection of the tie rod 8 is shown as an example in the opening 58 of the toothed belt pulley 61.

It is easy to imagine that when the pull-off disk 2 with its tie rods 7 through 10 is attached, these tie rods 7 through 10 with their respective associated stop webs 27 through 30 can be passed through the correspondingly associated openings 57 through 60 at least to the extent that they are positioned axially behind the pulley disk 63 of the toothed belt pulley 61, while the guide webs 31 through 34 are arranged axially in front of the pulley disk 63.

In this axial position, the stop webs 27 through 30 are brought, by rotating the pull-off disk 2 in the direction of arrow 68 (FIG. 3) relative to the toothed belt pulley 61, into a position in which they extend behind the respective associated opening 57 through 60 at least in some areas in the circumferential direction. The tie rod 8 is shown in such an engaged position in FIG. 4.

It can be clearly recognized that the stop web 28 is arranged behind the pulley disk 63 and extends behind the opening 58. The pulley disk 63 is now received in the area of the opening 58 between the stop web 28 and the corresponding guide web 32 in the circular receiving groove 36 formed by these two webs 28 and 32 in a positive-locking manner. This in turn means that by tightening the adjusting nut 4, which is not shown in FIG. 4, the toothed belt pulley 61 is pulled in the direction of arrow 72 against the pull-off disk and the pull-off disk 2 thus moves in the opposite direction toward the toothed belt pulley 61.

If the pull-off disk 2 now lies, as is shown in FIG. 3, on the toothed belt pulley 61 on its outer teeth 62 on the front side, a firmly seated hold can be achieved by further tightening the adjusting nuts 3 through 6 because of the positive-locking connection of the tie rods 7 through 10 in the correspondingly associated openings 57 through 60 of the pull-off disk 2 on the toothed belt pulley 61.

If, in contrast, the pull-off disk 2 is rotated against the direction of rotation 68 relative to the toothed belt pulley 61 after the pull-off disk 2 has been attached, the stop web 28 shown in FIG. 4 does not extend behind the opening 58 on the right-hand side, as is shown in FIG. 4, but on the left-hand side. Such an arrangement may be necessary to fix the rotated position of the toothed belt pulley 61, e.g., during the tightening of the fastening screw connection in order to apply the high torque necessary for tightening the fastening screw connection and to ensure at the same time that the positive-locking connection between the tie rods 7 through 10 and the openings 57 through 60 is not accidentally eliminated.

Figure 5:
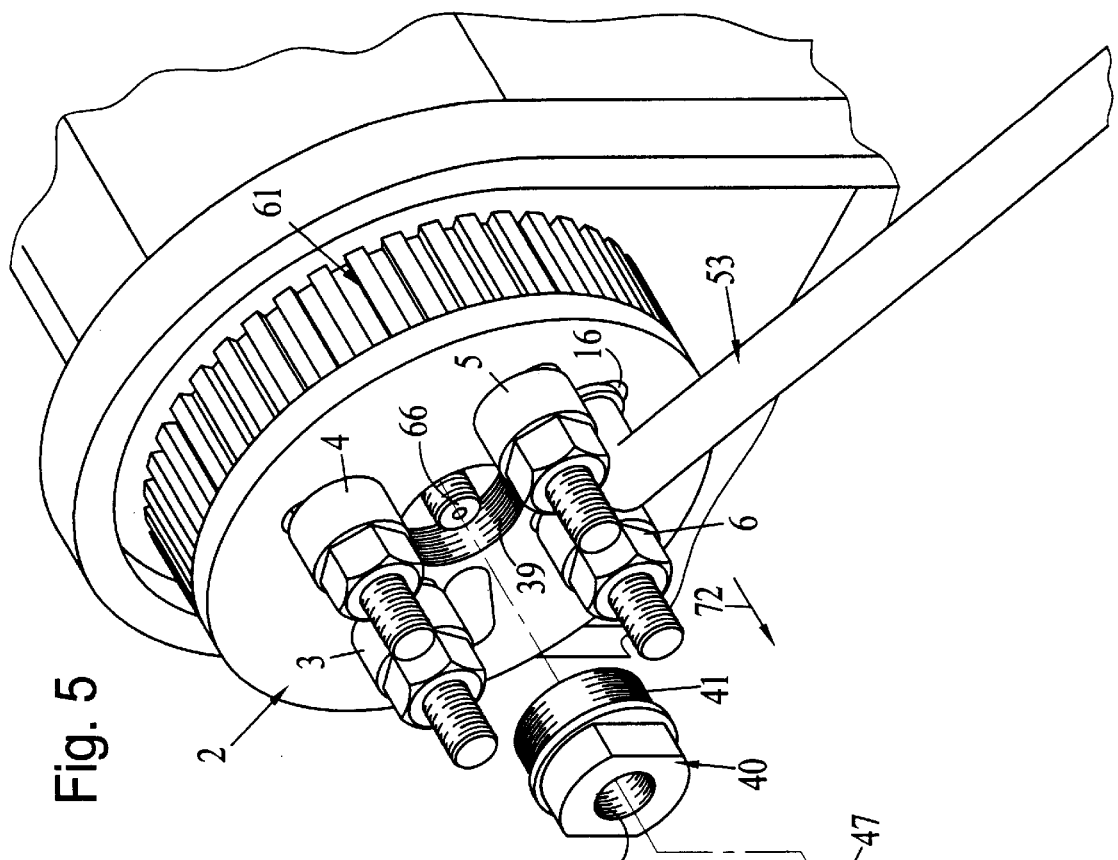
FIG. 5 is a perspective view of the toothed belt pulley from FIG. 3 with the fastening screw connection removed and with the spindle drive attached.

Once the fastening screw connection, represented as an example as a nut-and-pin connection in the preceding drawing figures, has been removed, the threaded pin 66 still continues to be recognizable within the threaded through hole 39 of the pull-off disk 2, as is apparent from FIG. 5.

The threaded sleeve 40 with its external thread 41 is screwed in this state into the threaded through hole 39 of the pull-off disk 2. The pressure screw 43 can now be screwed into the corresponding internal thread 42 of the threaded sleeve 40 after this operation.

It is easy to imagine that with the threaded sleeve mounted and the pressure screw 43 inserted, the pressure screw 43 with its pressing ball 48 (not visible in FIG. 5) is pressed against the front side of the threaded pin 66 by further actuation or tightening of the pressure screw 43 and the pull-off disk 2 is thus pulled off from the camshaft together with the toothed belt pulley 61 in the direction of arrow 72. After loosening the adjusting nuts 3 through 6, the pull-off disk 2 can now be again detached from the toothed belt pulley 61 and attached to a new toothed belt pulley 61, e.g., for mounting a new toothed belt pulley 61.

FIG. 5 also shows that the locking tool 53, which engages the guide slot 16 in a positive-locking engagement in FIG. 5, can also be used to fix or lock the rotated position of the pull-off disk 2 and thus also the toothed belt pulley 61 in this position and in this process step of pulling off the toothed belt pulley 61 from the camshaft.

Figure 6:
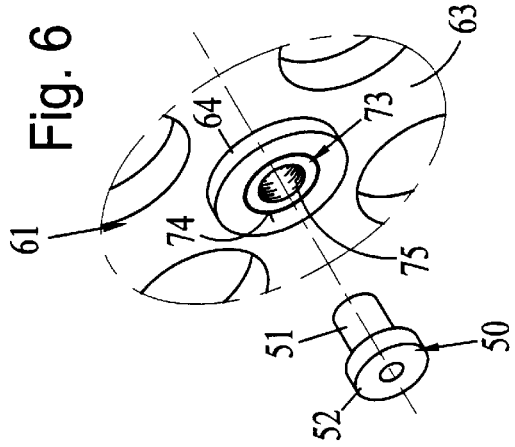
FIG. 6 is a pressure piece for use for a fastening screw with a mounting thread provided in the seating of a toothed belt pulley.

FIG. 6 shows a detail of the inner pulley disk 63 of the toothed belt pulley 61, which is mounted with its mounting hub 64 on the seating of a camshaft 73. Instead of the fastening screw connection from the preceding figures, comprising the threaded pin 66 and the mounting nut 67, an internal thread 75 is provided in this exemplary embodiment in the area of the seating 74 in the camshaft 73, with a mounting screw, not specifically shown in the drawing, being screwed into the said internal thread 75 for the firmly seated mounting of the toothed belt pulley 61 on the seating 74.

FIG. 6 correspondingly shows the situation in which this mounting screw has already been removed to replace the toothed belt pulley 61. To prevent the internal thread 75 of the camshaft 73 from being damaged by the push rod 47 of the pressure screw 43 during the pressing-out operation, the pressure piece 50 is provided, which can be inserted with its centering pin 51 into the internal thread 75 of the camshaft 73, as can be easily imagined based on FIG. 6. In the inserted state, the pressure piece 50 is now supported with its radially expanded support plate 52 on the front side on the camshaft 73 in a specific manner, so that damage to the internal thread 75 due to, e.g., deformations because of strong compressive forces, is prevented from occurring with certainty.

Figure 7:
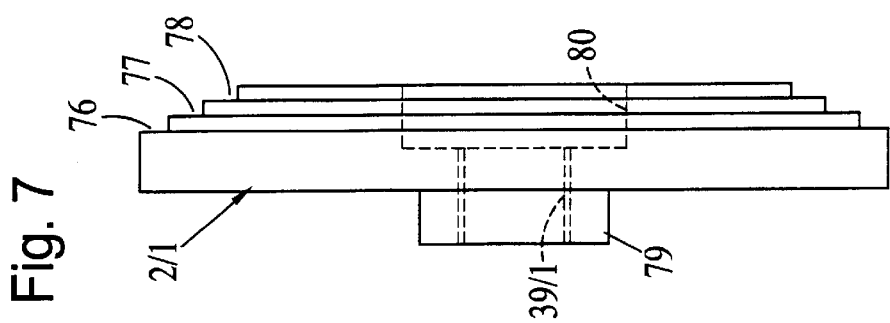
FIG. 7 is an exemplary embodiment of a pull-off disk with a plurality of centering shoulders as well as a threaded dome located axially opposite the said centering shoulders.

FIG. 7 shows an exemplary embodiment of a pull-off disk 2/1, which is provided for being attached to a toothed belt pulley to be pulled off, which has different centering steps 76, 77 and 78. These centering steps 76, 77, 78 are used to mount the pull-off disk 2/1 on toothed belt pulleys of different sizes in a centered manner. Furthermore, the pull-off disk 2/1 has a threaded dome 79 on its axial front side located opposite the centering steps 76 through 78, with the central threaded through hole 39/1 (indicated by broken line) of the pull-off disk 2 being provided, e.g., in the area of the said centering dome 79.

In the axial extension of the threaded through hole 39/1 toward the centering steps 76 through 78, the pull-off disk 2 has a cylindrical, radially expanding area 80 (represented by broken line), which can be used, e.g., in the state attached to a toothed belt pulley of a corresponding shape, to receive an axially projecting mounting hub of such a toothed belt pulley.

Figure 8:
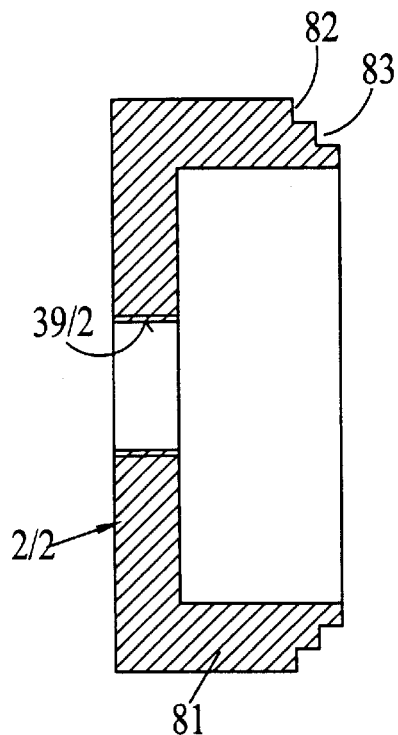
FIG. 8 is an exemplary embodiment of a pull-off disk of an approximately bell-shaped design.

Furthermore, to avoid a collision with an axially projecting mounting hub of a toothed belt pulley with certainty, the pull-off disk 2 may also have, e.g., a bell-shaped design, as is shown as an example in a sectional view in FIG. 8 for the pull-off disk 2/2. The pull-off disk 2/2 correspondingly forms a circular support wall 81, which may, e.g., likewise be provided with centering shoulders 82 and 83. It is also ensured by this bell shape of the pull-off disk 2/2 that a collision either with the mounting hub or with the fastening screw connection of a toothed belt pulley cannot occur. Due to the centering shoulders 82 and 83 of different diameters, which are likewise provided, this bell-shaped pull-off disk 2/2 can be reliably attached to toothed belt pulleys of different sizes in a centered manner.

Figure 9:
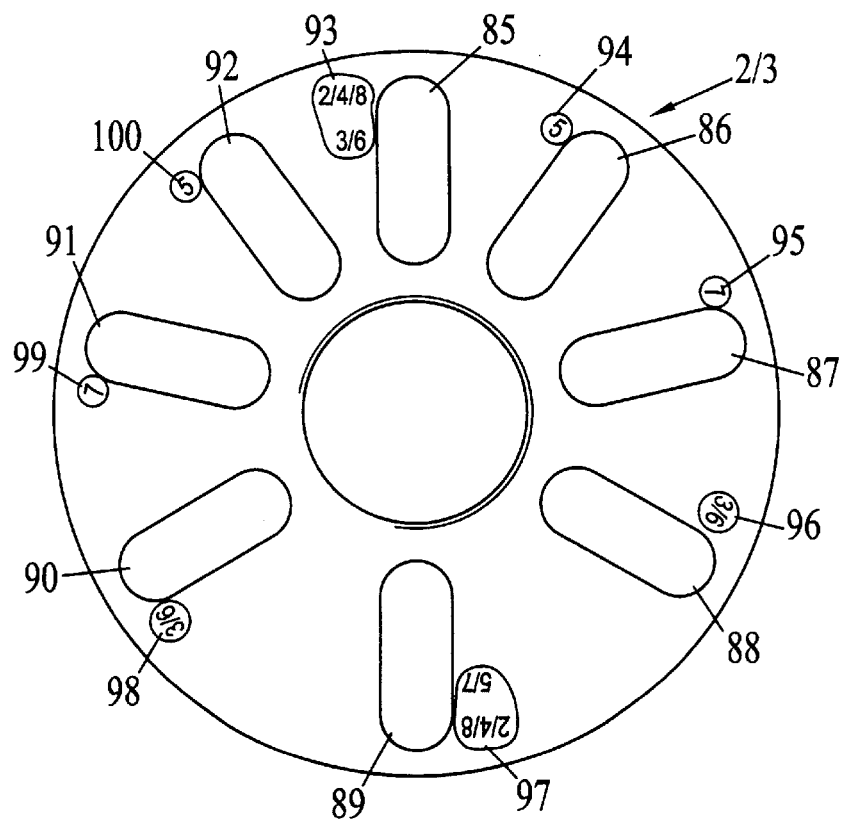
FIG. 9 is a top view of an exemplary embodiment of a pull-off disk with a plurality of radially arranged guide slots.

FIG. 9 shows another exemplary embodiment of a pull-off disk 2/3, in which a total of eight guide slots 85, 86, 87, 88, 89, 90, 91 and 92 are provided. These guide slots are arranged in different angular arrangements in the pull-off disk 2/3. The angular arrangements are selected now to be such that the pull-off disk 2/3 can be used for different toothed belt pulleys with different numbers and angular arrangements of openings due to different combinations of guide slots. Corresponding to the arrangement of the openings in the toothed belt pulley, different guide slots 85 through 92 are provided with corresponding tie rods and engaged with the corresponding openings of the corresponding toothed belt pulley. To facilitate the handling, the guide slots 85 through 92 are designated by the references numbers 93, 94, 95, 96, 97, 98, 100, which are boxed in FIG. 9 and which show which of the guide slots must be used in combination with one another to pull off certain toothed belt pulleys. The value of the respective reference numbers 93 through 100 indicates the number of openings in a toothed belt pulley for which the correspondingly associated guide slots 85 through 92 are to be used.

Thus, the two guide slots 85 and 89 are to be used, e.g., for toothed belt pulleys which are provided with two, four or eight openings distributed uniformly on the circumference. Only two tie rods are used now, which are correspondingly caused to engage two of the openings of the toothed belt pulley in question, which said openings are arranged diametrically opposing each other in the toothed belt pulley. The two guide slots 85 and 89 are correspondingly also designated with the reference numbers (2/4/8).

The guide slot 85 is also provided for use for toothed belt pulleys that are provided with three or six openings distributed uniformly on the circumference. The guide slot 85 is correspondingly also designated with the reference numbers (3/6) in addition to the reference numbers (2/4/8). In this case, the guide slot 85 is used with the two guide slots 88 and 90, which are arranged offset by 120° each in relation to the guide slot 85 in the pull-off disk 2/3 and which are likewise provided with the reference numbers (3/6).

In contrast, the guide slot 89 is used for toothed belt pulleys with 5 or 7 openings arranged distributed uniformly on the circumference. This guide slot 89 is used with the guide slots 86 and 92 to pull off a toothed belt pulley having five openings, on the one hand, and with the guide slots 87 and 91 to pull off a toothed belt pulley having seven openings, on the other hand. The guide slot is correspondingly provided additionally with the reference numbers (5/7), while the guide slots 86 and 92 are provided with the reference number (5), and the guide slots 87 and 91 are provided with the reference number (7). Three tie rods each are used in this case, which are combined with the corresponding guide slots. It is clear that the number of tie rods and guide slots to be used does not necessarily have to correspond to the number of openings present in the particular toothed belt pulley, but it may also be lower.

Figure 10:
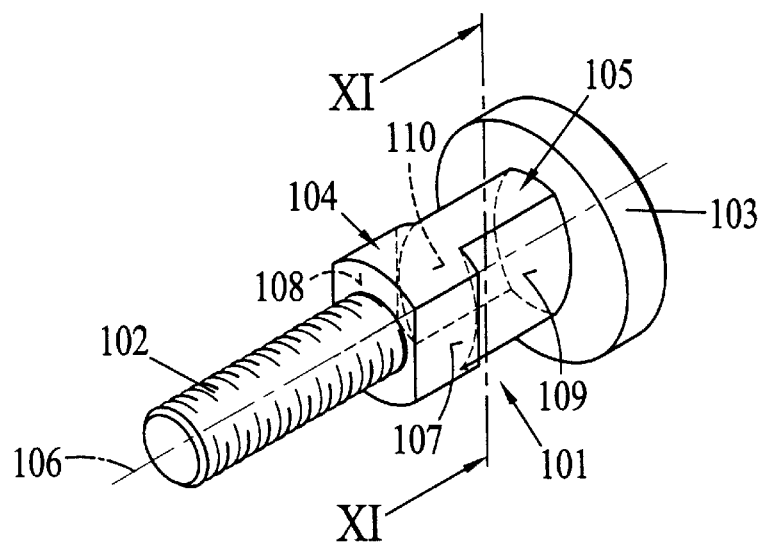
FIG. 10 is an exemplary embodiment of a tie rod with a specially designed guide section and mounting section.
Figure 11:
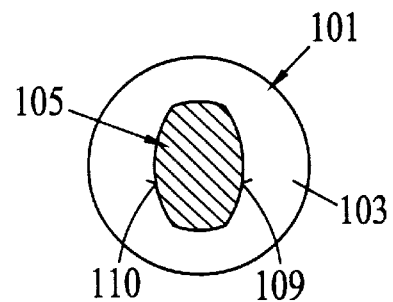
FIG. 11 is a section XI—XI from FIG. 10.

FIGS. 10 and 11 show another exemplary embodiment of a tie rod 101. The tie rod 101 has a threaded section 102, which corresponds to the threaded sections 23 through 26 of the tie rods 7 through 10 in FIG. 1. At its end located opposite the threaded section 102, the tie rod 101 is provided with a radially expanded, approximately round stop disk 103, with which the tie rod 101 can be brought into engagement with corresponding openings of a toothed belt pulley analogously to the stop webs 27 through 30 of the tie rods 7 through 10. The diameter of the stop disk 103 is selected to be only slightly smaller in this exemplary embodiment than the diameter of the openings of the toothed belt pulley, so that the largest possible stop face is obtained during the reaching behind the corresponding opening of the toothed belt pulley.

Between the stop disk 103 and the threaded section 102, the tie rod 101 has a guide section 104 extending toward the threaded section as well as a mounting section 105 arranged between this guide section 104 and the stop disk 103. The guide section 104 and the mounting section are formed from the originally cylindrical shape of the tie rod in this area.

To receive the tie rod 101 nonrotatably and axially displaceably in one of the guide slots of a pull-off disk, the guide section 104 has two guide faces 107 and 108, which extend in parallel and symmetrically to the central longitudinal axis 106 of the tie rod 101 and with which the tie rod 101 is introduced with a small clearance into one of the guide slots of the pull-off disk. Approximately in the circumferential area of the guide faces 107 and 108, the mounting section has two diametrically opposed contact surfaces 109 and 110. As can be recognized especially from FIG. 11, these contact surfaces 109, 110 are bent. The radius of curvature of these contact surfaces 109 and 110 corresponds to the radius of an opening of a toothed belt pulley for which the tie rod 101 is intended. Contact over the largest possible area is thus obtained during use between the mounting section 105 and one of its contact surfaces 109 or 110 in the particular opening of the toothed belt pulley. This in turn leads to a considerable reduction in the contact pressure between the contact surface and the corresponding opening of the toothed belt pulley, so that damage especially to the toothed belt pulley is prevented from occurring with certainty. As is shown by this exemplary embodiment of the tie rod 101, the mounting section 105 is not limited toward the guide section 104 with an additional guide web, as in the case of the exemplary embodiment for the receiving grooves 35 through 38 of the exemplary embodiments of the tie rods 7 through 10 shown in FIG. 1. Due to this design, the tie rod 101 can be introduced more simply into a corresponding opening of a toothed belt pulley.

Figure 12:
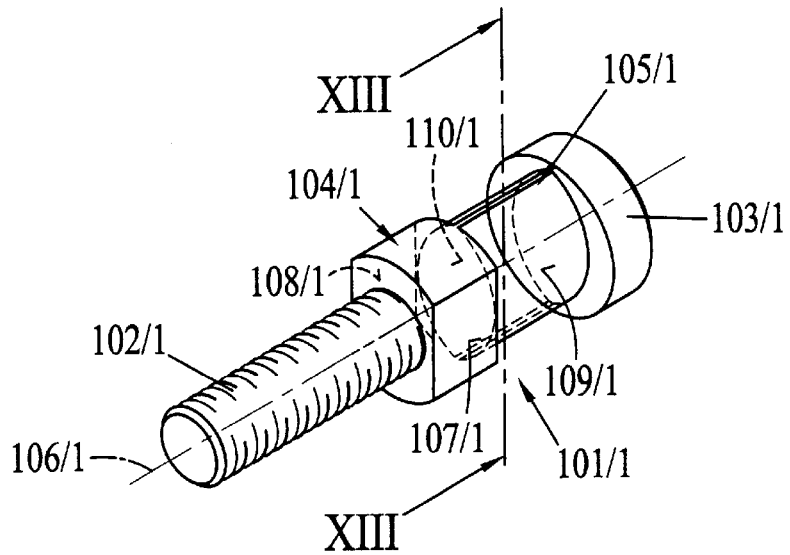
FIG. 12 is an embodiment variant of the tie rod from FIG. 10 with a different mounting section.
Figure 13:
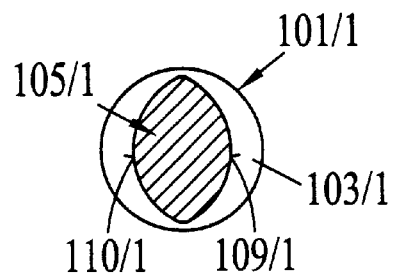
FIG. 13 is a section XIII—XIII from FIG. 12.

The tie rod 101/1 in FIGS. 12 and 13 also has a design similar to that of the tie rod 101 from FIGS. 10 and 11. This tie rod also has a threaded section 102/1, a guide section 104/1 with two guide faces 107/1 and 108/1, as well as a mounting section 105/1. Unlike in the exemplary embodiment according to FIGS. 10 and 11, the tie rod 101/1 is intended for openings of a smaller diameter in a toothed belt pulley. Thus, the stop disk 103/1 of the tie rod 101/1 has a diameter smaller than that of the stop disk 103 of the tie rod 101 and can be passed with a small clearance through one of the openings of a corresponding toothed belt pulley. Corresponding to this smaller diameter or radius of the opening, the contact surfaces 109/1 and 110/1 of the mounting section 105/1, which are arranged radially offset inwardly, are also provided with a smaller radius of curvature, as is apparent especially from FIG. 13. Analogously to the radius of curvature of the contact surface 109 and 110 of the tie rod 101, the radius of curvature of the two contact surfaces 109/1 and 10/1 of the mounting section 105/1 is the same as that of the openings of a corresponding toothed belt pulley, which openings have a correspondingly smaller diameter. An approximately lentil-shaped cross section of the mounting section 105/1 is obtained due to this smaller radius of curvature, as it is shown in a sectional view in FIG. 13.

Figure 14:
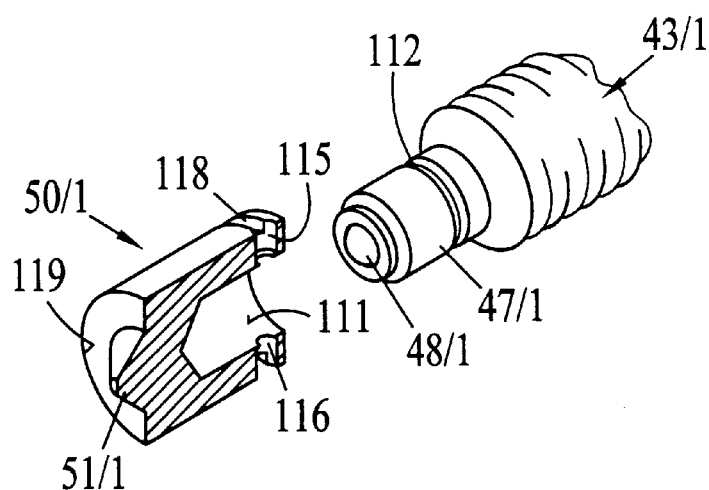
FIG. 14 is a partial perspective section of a pressure piece with the front end section of a pressure screw.
Figure 15:
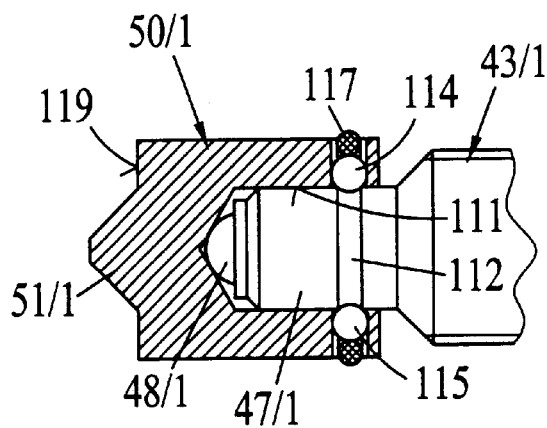
FIG. 15 is the longitudinal section of the pressure piece mounted on the pressure screw.

FIGS. 14 and 15 show another exemplary embodiment of a pressure piece 50/1 together with the front end section of an embodiment of a pressure screw 43/1. At its front end, the pressure screw 43/1 likewise has a push rod 47/1 with a pressing ball 48/1, via which the pressure screw 43/1 is likewise supported on the front side on a camshaft during use, as was already described in connection with the exemplary embodiment according to FIGS. 1 through 5.

The pressure piece 50/1 is provided toward the pressure screw 43/1 with a central mounting hole 111, with which the pressure piece 50/1 can be attached to the push rod 47/1 of the pressure screw 43/1. As is apparent from FIG. 15, the push rod 50/1 is supported on the pressing ball 48/1 in the axial direction in the state mounted on the push rod 47/1. To hold the pressure piece 50/1 captively and replaceably on the push rod 47/1, the push rod 47/1 has a circular locking groove 112, which is lockingly engaged by two locking balls 113 and 114 of the pressure piece 50/1 in the mounted state in a positive-locking manner. The locking balls 113 and 114 are accommodated in two diametrically opposed cross holes 115 and 116, which are arranged in the screw-side end area of the pressure piece 50/1. To press the locking balls 113 and 114 elastically into the circular locking groove 112 of the push rod 47/1, an elastic rubber ring 117 is provided in this exemplary embodiment, which is in turn accommodated in a circular groove 118 in the area of the cross holes 115 and 116 of the pressure piece 50/1, as is shown in FIG. 15. To mount the pressure piece 50/1 in a centered manner, it has at its front end a centering pin 51/1, which is approximately conical in this exemplary embodiment shown, so that centering in a corresponding internal thread of a camshaft is facilitated. For axial support at the camshaft in the radial area surrounding this internal thread of the camshaft, the pressure piece 50/1 has an approximately ring-shaped circular pressing surface 119 in the radial area surrounding the centering pin 51/1.

The handling of the device 1 according to the present invention is facilitated due to this design of the pressure piece 50/1 in conjunction with the design of the push rod 47/1 of the pressure screw 43/1 because the pressure piece 50/1 is held lockingly at the pressure screw 43/1 during operation and it does not have to be introduced in advance into the internal thread 75, as the pressure piece 50 in FIG. 1, as it is shown as an example in FIG. 6.

While specific embodiments of the invention have been shown and described in detail to illustrate the application of the principles of the invention, it will be understood that the invention may be embodied otherwise without departing from such principles.

What is claimed is:

1. A device for replacing a toothed belt pulley on a motor vehicle engine, the device comprising;
   a pull-off disk;
   at least two tie rods associated with said pull-off disk, said tie rods for engaging at least two openings of the toothed belt pulley in an axially firmly seated manner;
   at locking tool with a coupling piece for locking said pull-off disk
   a spindle drive arranged essentially centrally in said pull-off disk, said spindle drive being actuatable to pull the toothed belt pulley off from its seating by means of the pull-off disk engaging the toothed belt pulley, to receive said spindle drive, said pull-off disk having a central threaded through hole through which a wrench can be attached to a fastening screw connection of the toothed belt pulley, said pull-off disk having at least one additional opening for receiving in a positive-locking manner said coupling piece of said locking too, by which the toothed belt pulley can be locked in a particular rotated position via said pull-off disk.

2. A device in accordance with claim 1, wherein said pull-off disk has radially extending guide slots, each of said slots receiving a respective one of said tie rods in a radially adjustable manner.

3. A device in accordance with claim 2, wherein the said tie rods have at least two guide faces extending in parallel to a central longitudinal axis of the respective tie rod, said guide faces being received in said respective guide slot in axially displaceable and nonrotatable manner.

4. A device in accordance with claim 3, wherein said additional opening is formed by one of said guide slots, and respective dimensions of said guide slots are selected to be such that said guide section of said tie rod can be received in said guide slot as desired.

5. A device in accordance with claim 3, wherein said additional opening is formed by one of said guide slots, and respective dimensions of said guide slots are selected to be such that said guide section of said coupling piece of said locking tool can be received in said guide slot as desired.

6. A device in accordance with claim 2, wherein said guide slots are arranged in said pull-off disk to be adapted to the arrangement of said openings in said toothed belt pulley.

7. A device in accordance with claim 2, wherein different pull-off disks with different arrangements of said guide slots are provided for pulling off said toothed belt pulleys of different shapes.

8. A device in accordance with claim 1, further comprising adjusting nuts for axial adjustment of said tie rods, said pull-off disk being bracable against said toothed belt pulley by said adjusting nuts and said tie rods engaging said toothed belt pulley in a firmly seated manner.

9. A device in accordance with claim 1, wherein said tie rods have radially projecting circular stop webs at respective end areas facing said toothed belt pulley, said radially projecting circular stop webs extending said tie rods behind said respective openings of said toothed belt pulley in some areas in a positive-locking manner.

10. A device in accordance with claim 1, wherein said pull-off disk has at least one partially circular centering shoulder for centered attachment to said toothed belt pulley.

11. A device in accordance with claim 1, wherein said pull-off disk has a plurality of centering shoulders adjusted in diameter to different sizes of said toothed belt pulleys for centered attachment to said toothed belt pulleys of different sizes.

12. A device in accordance with claim 1, wherein said spindle drive has a threaded sleeve which can be screwed into a threaded hole of said pull-off disk, and further comprising a pressure piece which can be screwed through said threaded sleeve to pull off said toothed belt pulley.

13. A device in accordance with claim 12, wherein said pressure piece is provided so as to be insertable with a centering pin into said threaded hole of the fastening screw connection of a said toothed belt shaft to support said spindle drive during the pulling off of said toothed belt pulley in a centered manner.

14. A device in accordance with claim 1, wherein said pull-off disk has an outwardly directed threaded dome for receiving said spindle drive in the area of the threaded through hole.

15. A device in accordance with claim 1, wherein said pull-off disk has a bell-shaped design and has a circular support wall, with which said pull-off disk can be attached to the toothed belt pulley in a centered manner.

16. A device in accordance with claim 1, wherein said tie rods have a mounting section with at least one contact surface bent radially outwardly and having a radius of curvature approximately corresponding to the radius of an opening of the toothed belt pulley, the opening being engaged by said tie rod to pull off the toothed belt pulley.

17. A device in accordance with claim 1, wherein said tie rods have radially projecting stop disks at respective end areas facing said toothed belt pulley, said radially projecting stop disks extending said tie rods behind said respective openings of said toothed belt pulley in some areas in a positive-locking manner.

* * * * *